United States Patent Office 3,566,469
Patented Mar. 2, 1971

3,566,469
METHOD OF OBTAINING DENTAL BRIDGE APPLIANCES BY MEANS OF PREFORMED CROWNS AND THE RELEVANT TOOTH SHAPING CROWNS
Ugo Pelizzari, Via C. Mameli 10, Busto Arsizio, Italy
Filed Feb. 6, 1969, Ser. No. 797,122
Int. Cl. A61c *13/00*
U.S. Cl. 32—2          1 Claim

ABSTRACT OF THE DISCLOSURE

Manufacture of dental prosthetic appliances involves the placing of pieces of wax or the like having the rough shape of missing teeth into the gaps of these teeth in a plaster cast, then placing over these wax pieces caps having the shape of the missing teeth and removing excess wax.

---

Dental prosthesis appliances with a bridge or without a plate have, as is known, the task of reconstructing one or more teeth crowns, utilising the support of other teeth suitably prepared.

At present, such dental prosthesis appliances are obtained by modelling by hand layers of wax which are placed in the cavity or cavities and in the stump or stumps of the plaster cast, until there is obtained a perfectly anatomically shaped crown of teeth, from which an appliance is obtained by duplication after the wax thus modelled has hardened.

The modelling of such layers of wax to obtain teeth to the proper shape in all respects requires considerable time and experience on the part of the mechanic, as a result of which, in addition to work that is not always in accordance with the rules of the art, there is the high cost of production of the appliance.

The present invention has for its object to simplify the said operation of modelling teeth and to obtain at the same time executions that are perfect, all equal, even from personnel not highly skilled in this field, by means of a method providing for the use of caps (crowns) preformed to the required shape, made of plastic material or metal, to be placed by hooding onto the layer of wax previously inserted in the cavity or cavities of the model worked on, in such a way that the modelling operation of the entire tooth is limited to the shaping of the part protruding from said cap (crown), the carrying out of which does not demand any special skill, as almost the whole of the said wax layer is covered by the cap.

The method according to the invention consists, therefore, in placing into the cavity or cavities of the model, as many layers of wax as there are teeth to make up and, without modelling them, to force onto the latter the preformed caps until they are almost completely covered. A finishing of the part of the layer not covered by the caps, which can obviously be carried out with extreme ease and in a short time, as stated above, will be sufficient to supply a well prepared model for the amalgamation of the crown in the usual manner.

With the process under consideration it is possible to obtain fully cast aurea-acrylic and ceramic (porcelain) crowns, and also of Richmond type, as well as rear bridging assemblies, or also vestibular, lingual or palatal, in a short time, the dental engineer being almost entirely freed from performing modelling by hand, as stated earlier.

The present method applies naturally to the anatomic construction of all the teeth in the arrangement required, in their formation both total and partial, according to requirements.

Figure 1:
Figure 2:
Figure 3:
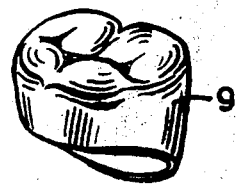
Figure 4:
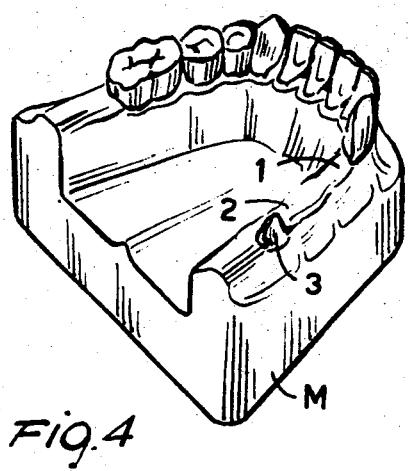
Figure 5:
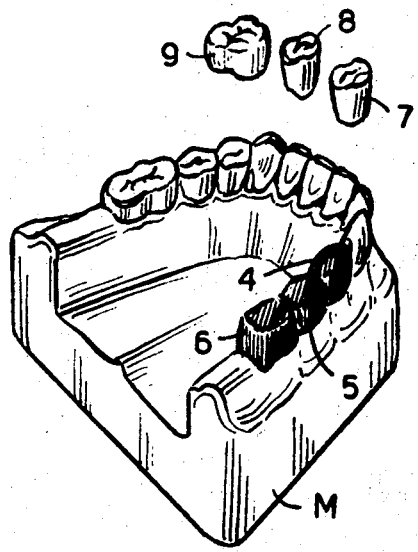
Figure 6:
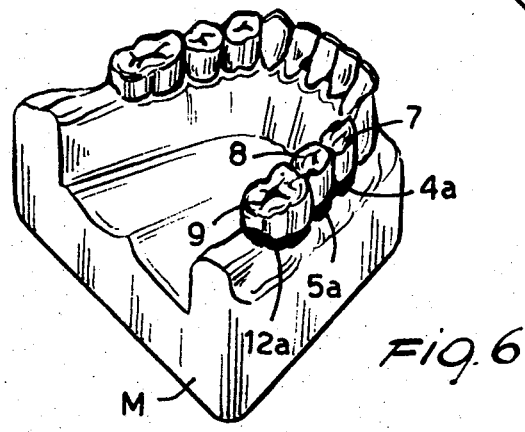

The invention will be better understood hereinunder with reference to the attached sheet of drawings, which shows, in FIGS. 1 to 3, some caps used in the process for obtaining models of vestibular bars, aureo-acrylic or aureo-ceramic crowns, or pin crowns of Richmond type and respectively, molar and premolar crowns, while FIGS. 4 to 6 represent a constructional example of a casting model for dental prosthesis obtained according to the method of the invention.

The casting model M for dental prosthesis represented in FIG. 4 clearly shows the cavities 1 and 2 to be filled, there being utilised the support offered by stump 3 already prepared in the mouth of the patient.

In the said cavities 1 and 2 and also above the stump 3 layers of wax 4, 5 and 6 are laid, roughly shaped in the form of a tooth, as shown in FIG. 5.

After this first operation the mechanic places, on said wax layers, the caps 7, 8 and 9 selected of the shape corresponding to the tooth to be prepared, forcing them downwards one by one until they cover the layers almost entirely, precisely in the manner indicated in FIG. 6. In that way there will be obtained a set of teeth completely conforming to the design up to almost their full height, and after having modelled the lower portion 4a, 5a and 12a protruding from the caps 7, 8 and 9 respectively, an operation which is obviously easy to carry out, even by personnel not exceedingly skilled, the model will be ready for casting in the usual manner in dental prosthesis.

Naturally, the set of caps available must be such as to meet every requirement, in such a way as to make the process suitable for the formation of all the teeth of any one dental prosthesis model. Furthermore, the preparation of said caps does not require any particularly expensive operations, as the caps are obtained by ordinary pressing of synthetic plastic materials or metals, as required, using stamps with multiple impressions, so that very large numbers of caps do not lead to the method becoming of difficult embodiment.

What is claimed is:
1. In the method of manufacturing dental prosthetic appliances from a plaster cast of a teeth assembly containing gaps of the missing teeth, the steps of placing a piece of wax having the rough shape of a missing tooth into each gap, placing a cap having substantially the precise shape of said missing tooth over said piece of wax, forcing said cap downwardly to enclose said piece of wax, and then removing the excess wax.

References Cited

UNITED STATES PATENTS 2,194,790  3/1940  Gluck _____ 32—12
3,197,866  8/1965  Barron _____ 32—5

ROBERT PESHOCK, Primary Examiner

U.S. Cl. X.R.

32—8